United States Patent [19]

Tsugeno et al.

[11] Patent Number: 5,230,953
[45] Date of Patent: Jul. 27, 1993

[54] SILICA PARTICLES AND PROCESS FOR PRODUCING THE SAME

[75] Inventors: Makoto Tsugeno; Yasushi Takako, both of Toyama; Masao Kubo, Tokyo; Tokumi Mochiyama, Ichihara; Yoshito Yuri, Ube, all of Japan

[73] Assignee: Nissan Chemical Industries Ltd., Tokyo, Japan

[21] Appl. No.: 625,424

[22] Filed: Dec. 11, 1990

[30] Foreign Application Priority Data

Dec. 14, 1989 [JP] Japan .................. 1-324447

[51] Int. Cl.$^5$ ............................... B32B 5/16
[52] U.S. Cl. .................... 428/331; 264/42; 264/43; 423/335; 423/338; 423/339; 423/470; 428/402
[58] Field of Search .............. 428/402, 331; 423/335, 423/338, 339, 470; 264/42, 43

[56] References Cited

U.S. PATENT DOCUMENTS

| | | | |
|---|---|---|---|
| 1,859,998 | 5/1932 | Svendsen | 423/336 |
| 1,959,749 | 5/1934 | Svendsend | 423/336 |
| 3,021,194 | 2/1962 | Cunningham | 423/335 |
| 4,010,242 | 5/1977 | Iler et al. | 423/335 |
| 4,508,607 | 4/1985 | Winyall | 204/180 P |
| 4,681,750 | 7/1987 | Johnson et al. | 423/339 |
| 5,030,433 | 7/1991 | Mehrotra | 423/335 |

FOREIGN PATENT DOCUMENTS

| | | |
|---|---|---|
| 0135976 | 4/1985 | European Pat. Off. . |
| 0150625 | 8/1985 | European Pat. Off. . |
| 326707 | 8/1989 | European Pat. Off. . |
| 0326707 | 8/1989 | European Pat. Off. . |
| 337712 | 10/1989 | European Pat. Off. . |
| 62-153111 | 2/1987 | Japan . |
| 63-182212 | 7/1988 | Japan . |
| 2151600 | 7/1985 | United Kingdom . |
| 2201407 | 9/1988 | United Kingdom . |

OTHER PUBLICATIONS

Chemical Abstracts, vol. 112, No. 6, Feb. 5, 1990, p. 206, abstract No. 39254s, Columbus, Ohio, U.S.; JP-A-01145318 (Nippon Steel Chem. Co., Ltd.) Jul. 6, 1989.
Patent Abstracts of Japan, vol. 12, No. 181 (C-499) (3028), May 27, 1988, and JP-A 62288110 (Daiki Rubber Kogyo K.K.) Dec. 15, 1987.

Primary Examiner—Paul J. Thibodeau
Assistant Examiner—Hoa T. Le
Attorney, Agent, or Firm—Oblon, Spivak, McClelland, Maier & Neustadt

[57] ABSTRACT

Silica particles having an average particle size of 5 to 100 μm, a BET specific surface area of not more than 20 m$^2$/g and a pore volume of not more than 0.1 ml/g, each of which has on its surface a plurality of protuberances with a smooth configuration, a diameter at half the protuberance height of the said protuberance being 0.2 to 5.0 μm and a height of the said protuberance being 0.2 to 4.0 μm, and a process for producing the silica particles, which comprises (A) reacting hydrosilicofluoric acid, ammonium silicofluoride or a mixture thereof with ammonia in an aqueous medium to form a silica slurry, (B) separating a silica from the silica slurry, and (C) calcining, after optionally drying, the separated silica at a temperature of not less than 500° C.

11 Claims, 3 Drawing Sheets

SILICA PARTICLES AND PROCESS FOR PRODUCING THE SAME

BACKGROUND OF THE INVENTION

The present invention relates to silica particles having protuberances in their surfaces, which particles are to be incorporated in resin or rubber, and a process for producing the silica particles. The silica particles according to the present invention are useful as a filler for semiconductor sealant resin compositions, polyesters, engineering plastics and silicone rubber.

Various kinds of inorganic fillers, especially silica, are popularly used for the purpose of improving the properties of high polymeric materials. For instance, in IC sealants, a silica filler in a ratio of about 70 wt % are blended with the matrix resin such as epoxy resin, polyphenylene sulfide, polyimide, etc., for the purpose of adjusting the coefficient of thermal expansion. With a recent tendency toward higher integration of semiconductors and oversizing of chips, a request is rising for high-purifying of sealant, lower stress and improvement of crack resistance. However, with the present state of art, these requirements are not yet fulfilled sufficiently.

The conventional silica filler has been obtained by the following methods:

(1) melt pulverization method of natural quartz,
(2) calcination and pulverization method of silica gel prepared by using sodium silicate,
(3) decomposition method of silicon tetrachloride by oxyhydrogen flames, and
(4) sol-gel method of alkoxysilane.

These methods, however, have the problems set forth below.

The method (1) has a problem in stable supply of natural quartz of good quality. It is also impossible with this method to reduce the content of the radioactive elements such as uranium, thorium, etc., which could cause erroneous operation (soft errors) of IC's. Silica produced by the method (2) is unusable as a silica sealant for highly integrated semiconductor devices because of probability of contamination with metal components such as sodium, aluminum, etc., or ionic impurities from sodium silicate used as a starting material or a neutralizing agent. The method (3) has problems of high production cost and difficulty in controlling particle size and shape. It is also impossible with this method to avoid inclusion of chlorine ions as an impurity. The method (4), although capable of producing high-purity silica by the purifying-treatment of the raw material, is complicated in production process, so that the produced silica becomes costly and its use is limited.

As regards the shape of silica filler, there has been mostly used square silica produced by the molten silica pulverization method. A composition containing the square silica, however, is poor in fluidity and its use tends to cause "hard errors" such as deformation of wiring or cracking of package due to stress of the sharp ends of the particles, so that recently spherical silica has come to be used usually for the improvement of fluidity and dispersion of stress. However such spherical silica still has the problems that it is relatively costly and that adhesion to resin is deteriorated, resulting in reduced strength of the molded package, since the silica particle surface is smoothened as a result of melting or sintering during the heat treatment in the production process.

As prior arts regarding silica particles having specific shapes, Japanese Patent Application Laid-Open (KOKAI) No. 182212/88 discloses the perfectly circular silica particles having a jagged surface, and U.S. Pat. No. No. 4,010,242 discloses a method of producing fine particles by using colloidal particles of 5 to 500 mµ as a starting material.

The silica particles proposed hitherto had the various problems in preparation and practical application, and accordingly the development of new silica particles free from the said technical problems such as concentration of stress, low fluidity and unsatisfactory adhesion to resin, which are observed in use of the conventional square or spherical silica as a filler has been required.

As a result of the present inventors, extensive and intensified studies for solving the said problems, it has been found that by (A) reacting hydrosilicofluoric acid, ammonium silicofluoride or a mixture thereof with ammonia in an aqueous medium to form a silica slurry, (B) separating a silica from the said slurry by means of a solid/liquid separation and (C) calcining, after optionally drying, the separated silica at a temperature of not less than 500° C., the silica particles having a specific surface configuration can be obtained, which are excellently suited for use as a filler. The present invention was achieved on the basis of this finding.

SUMMARY OF THE INVENTION

In a first aspect of the present invention, there are provided silica particles having an average particle size of 5 to 100 µm, a BET specific surface area of not more than 20 $m^2/g$ and a pore volume of not more than 0.1 ml/g, each of the particles having on its surface a plurality of smoothly configured protuberances, a diameter at half the protuberance height of the said protuberance being 0.2 to 5.0 µm and a height of the said protuberance being 0.2 to 4.0 µm.

In a second aspect of the present invention, there is provided a process for producing the silica particles having an average particle size of 5 to 100 µm, a BET specific surface area of not more than 20 $m^2/g$ and a pore volume of not more than 0.1 ml/g, each of the particles having on its surface a plurality of smoothly configured protuberances, a diameter at half the protuberance height of the said protuberance being 0.2 to 5.0 µm and a height of the said protuberance being 0.2 to 4.0 µm, which process comprises the steps of (a) reacting hydrosilicofluoric acid, ammonium silicofluoride or a mixture thereof with ammonia in an aqueous medium to form a silica slurry; (b) separating silica from the said slurry by means of a solid/liquid separation; and (c) drying optionally, and calcining the separated silica at a temperature of not less than 500° C.

In a third aspect of the present invention, there is provided a composition comprising (i) silica particles having an average particle size of 5 to 100 µm, a BET specific surface area of not more than 20 $m^2/g$ and a pore volume of not more than 0.1 ml/g, each of the particles having on its surface a plurality of protuberances, a diameter at half the protuberance height of the said protuberance being 0.2 to 5.0 µm and a height of the said protuberance being 0.2 to 4.0 µm, and (ii) a macromolecular material.

DETAILED DESCRIPTION OF THE INVENTION

Figure 1:
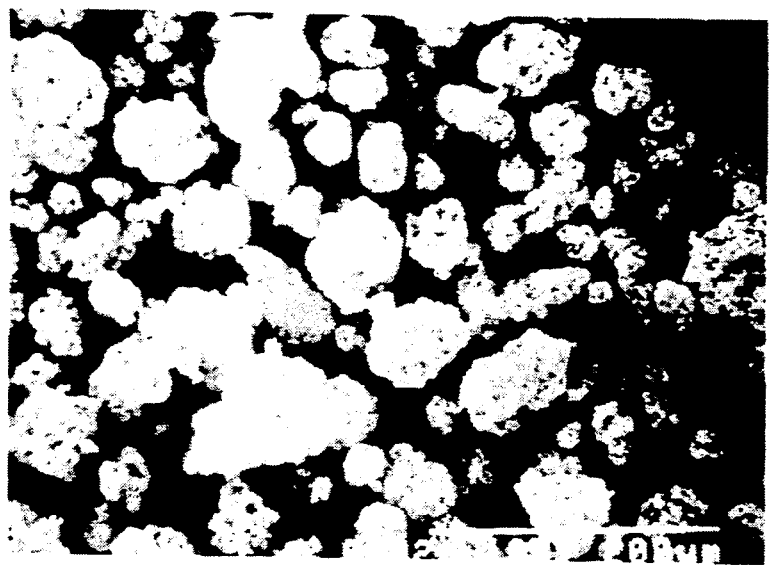
FIG. 1 is a scanning electron micrograph (×200 magnification) showing the structure of silica particles A obtained in Example 1.

The average particle size of the silica particles according to the present invention is in the range of 5 to 100 μm, preferably 5 to 50 μm. When the average particle size is less than 5 μm, a composition containing the particles is deteriorated in fluidity and moldability, and when the average particle size exceeds 100 μm, it becomes impossible to fill silica to a high density in a composite and mechanical strength of the composite is reduced. Although the average particle size is in the range of 5 to 100 μm, it is also undesirable, for the same reason, that fine silica particles of less than 5 μm in diameter or coarse silica particles exceeding 100 μm in diameter be contained at a high percentage.

The specific surface area, as measured by the BET method, of the silica particles according to the present invention is not more than 20 m$^2$/g, preferably not more than 10 m$^2$/g. When the BET specific surface area is more than 20 m$^2$/g, there arise the adverse effects by the high content of fine particles, and also mechanical strength of the silica particles themselves is reduced. In use of the silica particles of the present invention as a filler for an IC sealant, the BET specific surface are of the said particles is preferably less than 10 m$^2$/g, more preferably less than 5 m$^2$/g.

The pore volume of the silica particles of the present invention is not more than 0.1 ml/g, preferably not more than 0.05 ml/g. When it exceeds 0.1 ml/g, the mechanical strength of the particles themselves is reduced, and also air tends to be trapped in the pores, thereby causing air-release, or formation of voids in the course of kneading with a resin or in practical use of the composite. This is the cause of an unfavorable influence on quality of the composite or the products.

The protuberances in the surfaces of the silica particles according to the present invention have a smooth configuration, in other words a generally roundish configuration. The term "smooth configuration" used herein is to be understood to mean that there exists no sharp or spicular part on the particle surface. A height of such a protuberance is 0.2 to 4.0 μm, preferably 0.2 to 3.0 μm, in the case that the height is measured from the bottom of the recess between the adjoining protuberances. Also, a diameter of such a protuberance is 0.2 to 5.0 μm, preferably 0.2 to 3.0 μm at the height level which is half of the height of the protuberance (at half the protuberance height). It is also preferable that the height of the protuberance is 1.0 to 0.6-fold of the diameter.

An average number of protuberances per one silica particle is ordinarily not less than 100, preferably not less than 500, more preferably not less than 1000.

The height of the protuberances is preferably not more than 30%, more preferably not more than 10%, based on the average particle size of the particles.

The protuberances on the silica particle surface according to the present invention contribute to the improvement of adhesion between silica particles and matrix resin, resulting in enhanced mechanical strength of the resin composite.

When the diameter at half the protuberance height is less than 0.2 μm, the adhesion improving effect of the protuberances does not become conspicuous, and when the said diameter exceeds 5 μm, the number of the protuberances which are allowed to exist is lessened and also the contact area with matrix resin is reduced, so that the adhesion improving effect does not become conspicuous in comparison with the conventional spherical silica. It is also to be noted that appropriate roundness of the protuberances on the particle surface is able to disperse stress as opposed to the conventional pulverized square silica particles in which stress is concentrated at the end portions.

The silica particles of the present invention having the said protuberances of a specific configuration on the surface thereof and also possessing the said properties can be obtained typically by reacting hydrosilicofluoric acid and/or an ammonium salt thereof with ammonia in an aqueous medium, separating a silica and calcining the thus separated silica. Also, in case of using the starting materials, it is possible to produce the silica particles which have not only the said specific configuration and properties but also high purity as these particles are substantially free of metallic impurities.

The production process of the silica particles according to the present invention comprises the following steps:

(A) To react hydrosilicofluoric acid and/or an ammonium salt thereof with ammonia in an aqueous medium to form a silica slurry;

(B) To separate a silica from the slurry by means of a solid/liquid separation; and (C) To dry separated silica optionally, and to calcine the resultant silica.

As hydrosilicofluoric acid used as a starting material in the step (A), there can be used the commercially available reagents or the by-product formed in the wet preparation process of phosphoric acid. It can be also produced by aqueous liquid absorption of a gas containing silicon tetrafluoride. This hydrosilicofluoric acid is used in the form an aqueous solution with a concentration of usually about 5 to 40%.

Ammonium salt of hydrosilicofluoric acid, namely ammonium silicofluoride can be easily obtained by adding gaseous or aqueous ammonia to hydrosilicofluoric acid. It is also obtainable by ammonium fluoride liquid absorption of a gas containing silicon tetrafluoride.

In the present invention, hydrosilicofluoric acid and ammonium silicofluoride can be used either singly or in the form of a mixture.

Ammonia may be used either in a gaseous state or in the form of an aqueous solution.

The purity of the starting reactants can be properly selected according to the use of the produced silica. For obtaining the silica particles with high purity, hydrosilicofluoric acid is purified either directly by distillation or through aqueous liquid absorption of a silicon tetrachloride-containing gas by acid decomposition, while ammonium silicofluoride is purified by recrystallization or other suitable methods. Also, if necessary, both ammonia of a high purity and an aqueous medium which contains little metal impurity may be used.

As an aqueous medium, water and an inert aqueous organic solvent which reacts with neither a raw material nor a reaction product may be used. Water is preferable in the handling.

The reaction of hydrosilicofluoric acid and/or an ammonium salt thereof with ammonia is as shown below by reaction formulae:

$$H_2SiF_6 + 2NH_3 \rightarrow (NH_4)_2SiF_6$$

$$(NH_4)_2SiF_6 + 4NH_3 + 2H_2O \rightarrow SiO_2 + 6NH_4F$$

The molar ratio of ammonia to hydrosilicofluoric acid is 6 stoichiometrically, but usually it is in the range of 3 to 10, preferably 4 to 8. When the said molar ratio is low, the reaction rate is lowered correspondingly and pH of the final reaction slurry is on the acid side or around neutrality. When the said molar ratio is high, the reaction rate is raised and pH of the final reaction slurry is on the basic side. The pH of the reaction system is an important factor for controlling the shape of silica particles or their properties.

The molar ratio of ammonia to ammonium silicofluoride is 4 stoichiometrically, but usually it is in the range of 1 to 8, preferably 2 to 6.

The reaction may be carried out either batch-wise or continuous. As for the way of addition of the starting materials, the following methods are usable:

(1) Ammonia is added into an aqueous medium containing hydrosilicofluoric acid and/or an ammonium salt thereof.

(2) Contrary to method (1), hydrosilicofluoric and and/or an ammonium salt thereof is (are) added into an aqueous medium containing ammonia.

(3) Hydrosilicofluoric acid and/or an ammonium salt thereof and ammonia are added simultaneously into the aqueous medium.

(4) The above methods are used in combination.

When the method (1) is used, silica is produced in a pH region on the acid side in the early phase of reaction, and although the result is variable according to the other reaction conditions, there are generally obtained the silica particles which are small in size (height and diameter) of protuberances on the surface thereof, relatively compact and fine.

According to the method (2), silica is produced in a high pH region and there is a tendency toward production of coarse silica particles with relatively large-sized protuberances on the particle surface.

When using the method (3), the silica particles can be grown under a fixed pH condition by controlling the starting material feed rate to the reaction system.

In the production of the silica particles according to the present invention, the method (3), namely simultaneous addition of the component materials, is preferred. Especially, continuous supply of the two starting component materials in the presence of seed silica occurs the growth of silica particles and there can be easily obtained the silica particles having the said protuberances on the surface. The seed silica may be produced according to the method (1).

The reaction of hydrosilicofluoric acid and/or an ammonium salt thereof with ammonia in an aqueous medium is usually started at a temperature in the range of 0° to 100° C., typically at around room temperature, and the reaction is conducted on accompanied by a rise of temperature of about 10° to 50° C. by heat of the reaction. In some cases, the reaction can be conducted at a high temperature above 80° C.

The above reaction is ordinarily carried out under normal pressure or thereabound, but it may be conducted under pressure at a temperature above 100° C. or under reduced pressure at a temperature below 80° C. The rise of reaction temperature has a tendency to enlarge the particle size of the produced silica particles or the protuberance diameter.

The reaction is ordinarily carried out in the range of pH 4 to 11, preferably 5 to 10.

Reaction time can not be specified as it is variable depending on the reaction style, starting material addition method and other reaction conditions. But, usually, it is in the range from one minute to 10 hours, preferably from 10 minutes to 5 hours. After the reaction, the reaction mixture may be subjected to aging.

The silica concentration in the reaction system is usually in the range of 0.5 to 18 wt %, preferably 1 to 10 wt %, more preferably 2 to 7 wt %. A too low silica concentration results in a poor productivity of the objective silica particles, while a too high silica concentration makes it difficult to control the reaction.

In carrying out the above reaction according to the present invention, the reaction system may contain, beside the starting materials, an additive or additives such as various types of salts (ammonium fluoride, ammonium chloride, ammonium sulfate, etc.), polyvinyl alcohol, binder such as cellulose, surfactant, etc.

Thus, in the step (A) of the process according to the present invention, a silica slurry is obtained by carrying out the above-described reaction by properly selecting the said reaction conditions such as the kind and molar ratio of the starting materials, reaction style, adding method, pH, temperature, silica concentration, additive(s), etc., and the slurry thus obtained is subjected to the next step (B).

Since the silica slurry formed by the above reaction coexists with by-produced ammonium fluoride solution, in the step (B) the reaction product is subjected to a solid/liquid separation such as filtration under the reduced pressure, filtration under the pressure, centrifugation, etc., to form silica cakes. Since the obtained silica cakes contain a small quantity of ammonium fluoride due to adhesion of the mother liquor, the said cakes are washed with water or an organic solvent to remove the said ammonium fluoride. It is also possible to remove the coexisting ammonia by conducting a suitable treatment such as an acid washing or a hot water extraction.

The water and acid used for washing or the said treatment need to be substantially free of impurities (especially metals).

In the step (C), the said wet silica is calcined, after drying if necessary, to obtain the silica particles of the present invention having the said configuration.

The drying can be effected by commonly employed a drying method such as hot-air drying, vacuum drying, spray drying, flash drying and fluidized drying at a temperature in the range of 50° to 200° C.

The calcination is performed at a high temperature above 500° C., preferably above 900° C., but use of an excessively high temperature is undesirable for maintaining the specified shape and properties of the silica particles obtained. Usually the calcining temperature is below the melting point of silica, preferably below 1,500° C.

Due to the product prepared by reacting hydrosilicofluoric acid and/or an ammonium salt thereof with ammonia in an aqueous medium, the silica particles obtained according to the present invention can be worked into a high-purity product with high added-value as a filler for resin, rubber and other materials, and the metallic impurity in the composite can be reduced to a level below 1,000 ppm, preferably below 100 ppm, more preferably below 10 ppm, expressed as the total content of metal oxides. In use of the silica particles of the present invention as a material for electrical parts, it is preferable that the particles are substantially free of alkaline metals such as sodium and potassium. Also, the silica particles produced according to the present invention can meet the requirement of low $\alpha$-ray emission in use as an IC sealant since according to the production process of the present invention, there can be formed the silica particles with a content of radioactive elements such as uranium and thorium below 10 ppb, preferably below 1 ppb, more preferably below 0.5 ppb, by purification treatments in the stage of raw material.

The silica particles of the present invention are expected to find a wide scope of practical use, but they are particularly useful as a filler for improving the properties of macromolecular materials such as resins and rubbers by making use of the said specific shape and properties of the particles. Especially, the silica particles are useful as a reinforcing agent or an adjuster of the coefficient of the thermal expansion of the macromolecular material.

The amount of the silica particles used depends on the kinds of the macromolecular materials and purposes of the use, and it is not specified, but the amount of the silica particles is ordinarily 1 to 95%, preferably 5 to 90% by weight based on the total amount of the macromolecular material and the silica particles.

As the resin for the matrix of the composite of the present invention, there can be used thermoplastic resins such as polyvinyl chloride, polyethylene, polypropylene, polytetrafluoroethylene, polystyrene, poly(-meth)acrylic esters, polycarbonate, polyester, polyamide, polysulfone, polyphenylene sulfide, liquid crystal polymers, etc., and thermosetting resins such as phenol resin, urea resin, melamine resin, epoxy resin, polyimide, unsaturated polyester resin, etc.

As the rubber therefor, natural rubber, synthetic rubber, silicone rubber, etc. may be exemplified.

The composite can be obtained by molding a composition comprising the silica particles and the macromolecular material by the conventional method.

The composition may be obtained by mixing the silica particles and a powder of the macromolecular material or by kneading the silica particles and the macromolecular material and pulverizing. The composition is excellent in fluidity and moldability.

The composite or the composition composed of the silica particles of the present invention and the resin or the rubber may contain an additive such as a coupling agent and a release agent, in ordinarily usable amount.

Also, a surface treatment, for example, a treatment with a coupling agent such as a silicone compound or titanium compound, and surface graft polymerization treatment may be conducted on the surface of the silica particles for the purposes of further improvement of adhesion and compatibility between matrix resin and silica particles, and prevention of intrusion (absorption) of moisture from the outside of the system to enhance performance of the silica particles.

Especially, a composite comprising the silica particles and a epoxy resin is useful as an IC sealant.

As described above, since the silica particles of the present invention has the high purity, and the specific surface configuration, such silica particles according to the present invention are free from the concentration of stress, and have a sufficient adhesion to the resin. Further, the silica particles are useful as a raw material of the composite which is excellent in their properties such as a bending strength. [Examples]

The present invention is described in further detail below with reference to the non-limitative examples thereof.

Properties of silica particles were evaluated according to the followings:

(1) Average particle size

Measured by a laser diffraction particle size distribution analyzer.

(2) Specific surface area

Measured according to BET method with using nitrogen.

(3) Pore volume

Measured according to a nitrogen-adsorption method.

(4) Height and diameter of a protuberance

A height and a diameter of a protuberance were measured on a electron micrograph.

(5) The contents of metal impurities

From a sample, a silica component was removed as a volatile component by hydrofluoric acid treatment. The residue was dissolved by a dilute acid, the contents of metal impurities were determined according to ICP (Inductivity Coupled Plasma) emission spectroscopic analysis.

(6) Ignition loss

After a sample which was previously dried at 105° C. was heated at 950° C. for 1 hour, a loss in weight was measured.

EXAMPLE 1

Into a 20-liter reactor provided with a stirrer (stirring reactor), 3 kg of 25% ammonia water was supplied. Then, 11 kg of 20% hydrosilicofluoric acid solution and 4.5 kg of 25% ammonia water were added thereto simultaneously at room temperature at the flow rates of 0.37 kg/hr and 0.15 kg/hr, respectively, by using constant delivery pumps. The resultantly formed silica slurry was centrifuged. The ammonium fluoride solution was removed as mother liquor and the silica cakes were washed with 100 liters of water and 5 liters of methanol. The washed silica cakes were subjected to 12-hour hot-air drying at 105° C. and then calcined in an electric muffle furnace at 1,200° C. for 2 hours to obtain 0.9 kg of calcined silica particles A.

Figure 2:
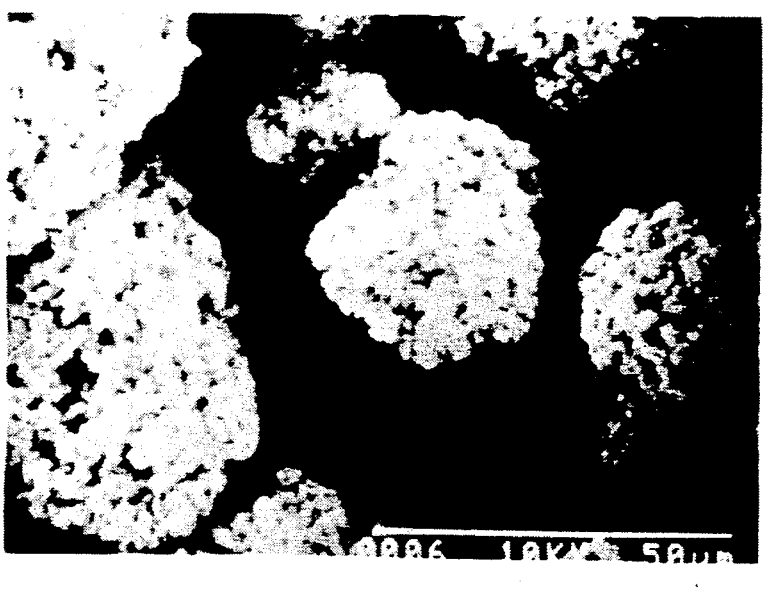
FIG. 2 is a scanning electron micrograph (×1000 magnification) showing the structure of silica particles A obtained in Example 1.

These silica particles, as observed from their scanning electron micrographs (see FIGS. 1 and 2), had a plurality of roundish protuberances forming ruggedness over the whole particle surface.

Protuberances were observed, which had the heights of 0.3 to 2.0 $\mu$m and the diameters at half the protuberance heights of 0.3 to 2.0 $\mu$m.

The average particle size was 25.8 $\mu$m. The particles also had a BET specific surface area of 2.5 m$^2$/g and a pore volume of 0.01 ml/g.

The content of metallic impurities calculated in terms of contents of oxides was as follows (unit: ppm):

| $Al_2O_3$ | $Fe_2O_3$ | CaO | $NaO_2$ |
|---|---|---|---|
| 0.6 | 3.3 | 3.0 | 0.3 |

A blend of the silica particles A and the following materials was kneaded by heated rolls, then cooled and pulverized to obtain an epoxy resin composition.

| Blend formulation | |
|---|---|
| Cresol novolak epoxy resin | 19 (parts by weight) |
| Phenol novolak resin | 8 |
| c-glycidoxypropyltrimethoxy-silane (coupling agent) | 2 |
| Releasing agent | 1 |
| Silica particles A | 70 |

In addition, the same composition as above was prepared except that square silica particles (average particle size: 25 μm) produced by the crushing method was used instead of the silica particle A.

The composition containing the silica particle A was excellent in fluidity, compared with the composition containing square silica particles (average particle size: 25 μm) produced by the crushing method.

EXAMPLE 2

Into a 10-liter stirring reactor, 3.6 kg of purified 20% hydrosilicofluoric acid solution was supplied, followed by addition of 2.65 kg of 25% ammonia water over a period of 30 minutes. The reaction temperature rose from 20° C. to 57° C. and fine silica particles were produced. The resultantly formed silica slurry was homogenized by stirring. 1.25 kg of this silica slurry was collected and transferred into an another 10-liter reactor. Into this seed silica slurry were added simultaneously 3.6 kg of purified 20% hydrosilicofluoric acid solution and 2.45 kg of 25% ammonia water over a period of one hour. The temperature of the reaction solution rose from 21° C. to 38° C. There was obtained 7.1 kg of primary reaction silica slurry.

Into the other 10-liter reactor, 1.25 kg of this primary reaction silica slurry was transferred, and hydrosilicofluoric acid solution and ammonia water were added thereto simultaneously under the same conditions as in the case of the primary reaction to obtain 7.2 kg of secondary reaction silica slurry.

This secondary reaction silica slurry was subjected to a solid/liquid separating operation by using a vacuum filter to remove the ammonium fluoride solution (mother liquor) containing excess ammonia, and the silica cakes were washed with a large amount of pure water and then hot-air dried at 120° C.

The dried silica cakes were then calcined at 1,250° C. for 3 hours to obtain 0.33 kg of silica particles B of the present invention.

The impurity content (ppm) expressed as contents of metal oxides was as follows:

| $Al_2O_3$ | $Fe_2O_3$ | CaO | $NaO_2$ |
|---|---|---|---|
| 0.3 | 0.6 | 0.2 | <0.1 |

The contents (ppb) of the radioactive elements were as follows:

U<1.0 Th<1.0

Figure 3:
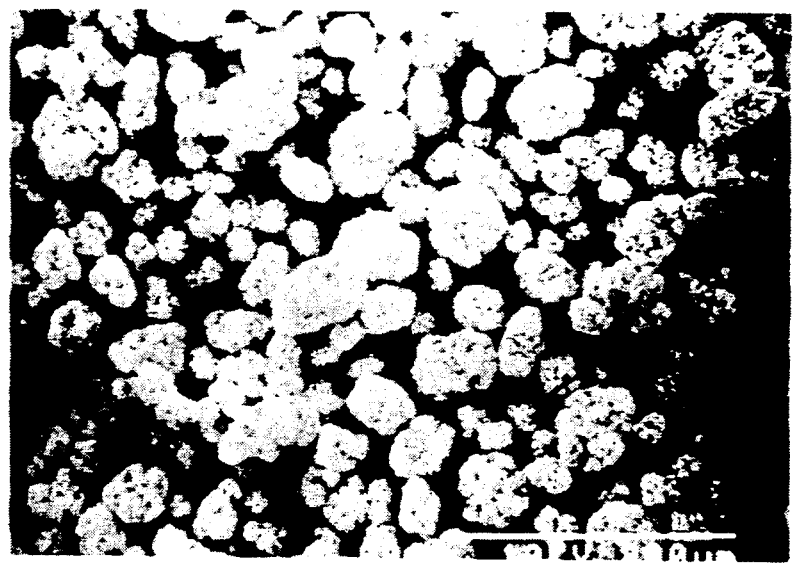
FIG. 3 is a scanning electron micrograph (×200 magnification) showing the structure of silica particles B obtained in Example 2.
Figure 4:
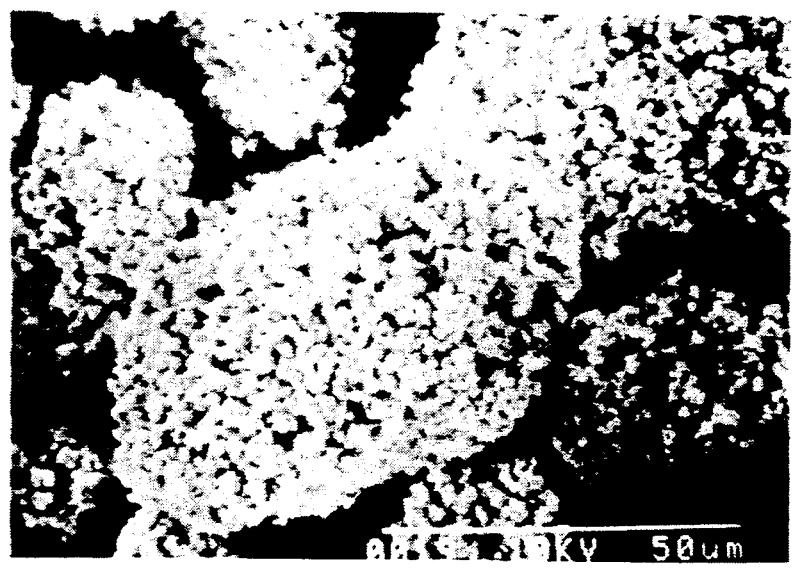
FIG. 4 is a scanning electron micrograph (×1000 magnification) showing the structure of silica particles B obtained in Example 2.

These silica particles B as observed from their scanning electron micrographs (see FIGS. 3 and 4) had a plurality of roundish protuberances over the whole particle surface. Protuberances were observed, which had the heights of 0.5 to 3.0 μm and the diameters at half the protuberance heights of 0.5 to 3.0 μm. The average particle size was 26.0 μm. These particles also had a BET specific surface area of 0.6 m²/g and a pore volume of 0.003 ml/g.

In the same way as Example 1, compositions were prepared except that the silica particles B and spherical silica particles having an average particle size of 25 μm were respectively used.

Each of the compositions was cast into a heated mold to obtain a hardened body (composite). The bending strength of each of the composites was measured. The bending strength of the composite containing the silica particles B was larger by 30% than that of the composite containing the spherical silica particles having an average particle size of 25 μm.

EXAMPLE 3

Into a 20-liter stirring reactor, 7.5 kg of 25% ammonia water was supplied, and then 11 kg of purified 20% hydrosilicofluoric acid solution was added thereto over a period of 60 minutes to form a silica slurry. This silica slurry was filtered under a reduced pressure, and the formed silica cakes were washed with 150 liters of water and one liter of methanol and then hot-air dried at 105° C. to obtain dry silica particles C'. These dry silica particles C' were calcined in an electric furnace at 1,200° C. for 2 hours to obtain 0.9 kg of silica particles C of the present invention.

Figure 5:
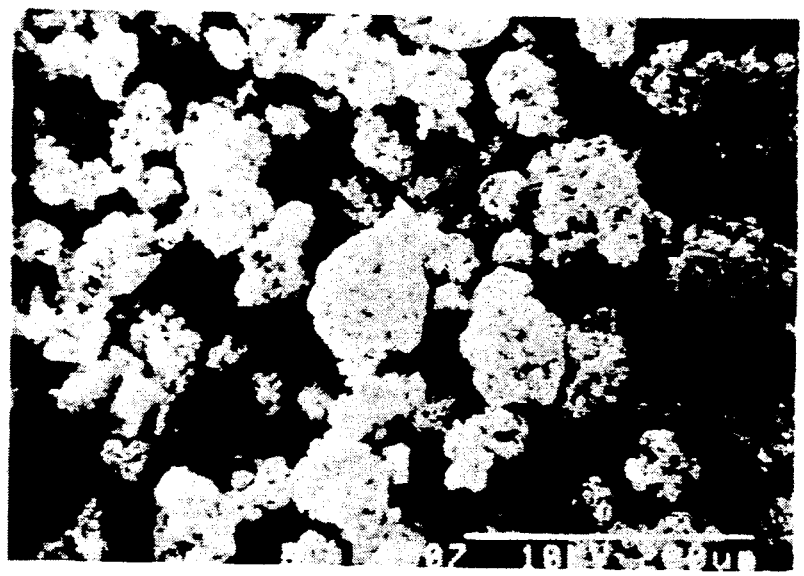
FIG. 5 is a scanning electron micrograph (×200 magnification) showing the structure of silica particles C obtained in Example 3.
Figure 6:
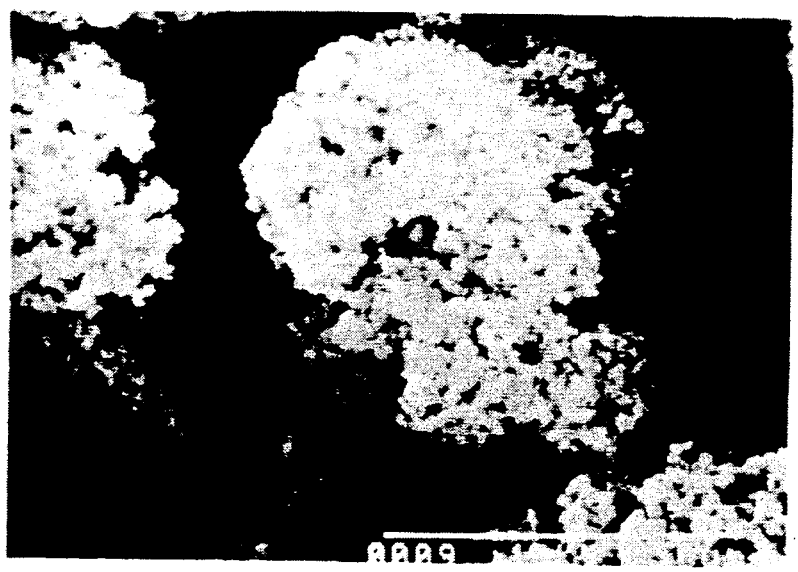
FIG. 6 is a scanning electron micrograph (×1000 magnification) showing the structure of silica particles C obtained in Example 3.

These silica particles C, as observed from their scanning electron micrographs (see FIGS. 5 and 6), had a plurality of roundish protuberances forming a continuum of concavities and convexities over the whole particle surface. Protuberances were observed, which had the heights of 0.2 to 1.0 μm and the diameters at half the protuberance heights of 0.2 to 1.0 μm.

The property data of said silica particles C and C' are shown below.

| | Particles C | Particles C' |
|---|---|---|
| Average particle size (μm) | 30.5 | —*¹ |
| BET specific surface are (m²/g) | 1.8 | 314 |
| Pore volume (ml/g) | 0.005 | 0.16 |
| Ignition loss (wt %) | 0.01 | 6.9 |

*¹unmeasurable because of break of particles

The impurity content (ppm) expressed as the contents of metal oxides was as shown below:

| $Al_2O_3$ | $Fe_2O_3$ | CaO | $NaO_2$ |
|---|---|---|---|
| 0.5 | 0.2 | 0.5 | <0.1 |

In the same way as Example 2, compositions and composites were prepared except that the silica particles C and the silica particles C' were respectively used.

In the case that the silica particles C were used, fluidity, bending strength and packing property are excellent. But, in the case that the silica particles C' were used, there occurred air-release and break of the particles during kneading with the resin and the fluidity was inferior.

What is claimed is:

1. Silica particles having an average particle size of 5 to 100 μm, a BET specific area of not more than 20 m$^2$/g and a pore volume of not more than 0.1 ml/g.
each of said silica particles having on its surface a plurality of protuberances with a smooth configuration,
the diameter at half the protuberance height of said protuberance being 0.2 to 5.0 μm,
the height of said protuberance being 0.2 to 4.0 μm, 0.6 to 1.0-fold of the diameter and not more than 30% based on the average particle size, and
the average number of said protuberance per one silica particle being not less than 100.

2. Silica particles according to claim 1, wherein the content of metal impurities, expressed as the content of metal oxides, is not more than 1,000 ppm.

3. A process for producing silica particles as defined in claim 1,
said process comprising (A) reacting hydrosilicofluoric acid, ammonium silicofluoride or a mixture thereof with ammonia in an aqueous medium to form a silica slurry, (B) separating silica from said slurry by means of a solid/liquid separation, and (C) calcining, after optionally drying, the separated silica at a temperature of not less than 500° C. and below the melting point of silica.

4. A process according to claim 3, wherein in step (A) of forming a silica slurry, hydrosilicofluoric acid, ammonium silicofluoride or a mixture thereof and ammonia are added simultaneously into an aqueous medium.

5. A process according to claim 4, wherein said aqueous medium contains a seed silica.

6. A process according to claim 3, wherein said hydrosilicofluoric is purified either directly by distillation or through aqueous liquid absorption of a silicon tetrachloride-containing gas by acid decomposition.

7. A composition comprising (i) the silica particles as defined in claim 1, and (ii) a matrix of thermoplastic resins, thermosetting resins or rubbers.

8. A composition according to claim 7, wherein said thermoplastic resins are selected from the group consisting of polyvinyl chloride, polyethylene, propylene, polytetrafluoroethylene, polystyrene, poly(meth)acrylic esters, poloycarbonate, polyester, polyamide, polysulfone, polyphenylene sulfide and liquid crystal polymers.

9. A composition according to claim 7, wherein said thermosetting resins are selected from the group consisting of phenol resin, urea resin, melamine resin, epoxy resin, polyimide and unsaturated polyester resin.

10. A composition according to claim 7, wherein said rubbers are selected from the group consisting of natural rubber, synthetic rubber and silicone rubber.

11. A composite produced by molding the composition as defined in claim 7.

* * * * *